United States Patent

[11] 3,613,642

| [72] | Inventors | George Restall<br>27 Little Aston Lane, Sutton Coldfield Warks;<br>Robert M. Hattersley, 2 Eastfield Road, Royston Herts, both of England |
|---|---|---|
| [21] | Appl. No. | 837,837 |
| [22] | Filed | June 30, 1969 |
| [45] | Patented | Oct. 19, 1971 |
| [32] | Priority | July 2, 1968 |
| [33] | | Great Britain |
| [31] | | 31529/68 |

[54] DEVICE FOR SUPPLYING ANIMALS WITH WATER OR OTHER LIQUID
5 Claims, 4 Drawing Figs.

[52] U.S. Cl. ................................................. 119/75, 119/72.5
[51] Int. Cl. ............................................... A01k 07/00
[50] Field of Search ................................... 119/72.5, 75, 71

[56] References Cited
UNITED STATES PATENTS

| 3,179,085 | 4/1965 | McKillip, Jr. .................. | 119/75 |
| 3,289,635 | 12/1966 | Eagles ........................... | 119/72.5 |
| 3,498,269 | 3/1970 | Von Taschitzki ............ | 119/75 |

Primary Examiner—Hugh R. Chamblee
Attorney—Kenway, Jenney & Hildreth

ABSTRACT: The invention provides a device such as a drinking nozzle for supplying animals with water or other liquid and comprises a housing, a pivotable valve operating member extending from the housing such that when an animal takes the valve-operating member in its mouth and pivots the valve-operating member liquid flows into the animal's mouth. The device is also provided with a fixed extension extending from the housing adjacent the valve-operating member in order to guard the valve-operating member against operation by an animal leaning against the valve-operating member. The animal pivots the valve-operating member to obtain a supply of liquid by squeezing the valve-operating member and the fixed extension together in its mouth.

PATENTED OCT 19 1971 3,613,642

INVENTORS
George Restall &
Robert M. Hattersley
BY
Kenway, Jenney & Hildreth
ATTORNEY

DEVICE FOR SUPPLYING ANIMALS WITH WATER OR OTHER LIQUID The invention relates in general to devices for supplying animals with water or other liquid.

It is known to produce a device for supplying animals with water or other liquid which incorporates a valve-operating member which should be operated by the mouth of the animal in order to open a valve and to give the animal a supply of liquid. An advantage of such devices is that the water which the animal drinks is always fresh and provided the animal uses the device correctly there is no wastage of water or other liquid and the enclosure within which the device is fitted remains dry. However there is a tendency for animals to operate such devices inadvertently or even to play with the device deliberately, for example by leaning against it and producing a flow of liquid.

An object of the present invention is to provide an improved animal drinking device which overcomes the above-mentioned problem.

According to one aspect of the present invention there is provided a device for supplying animals with water or other liquid comprising a housing, a valve orifice through which in use liquid is supplied to the interior of the housing, a movable valve member within the housing adapted to control the flow of liquid through the valve orifice a movable valve-supporting member extending out through an opening in the housing, a liquid outlet passage communicating with the interior of the housing and resilient sealing means adapted to seal the valve-supporting member in the opening in the housing and to urge the valve member into a position where it closes the orifice, the arrangement being such that tilting movement of the valve-supporting member moves the valve member to open the orifice and thereby provide a flow of liquid through the liquid outlet passage, the device being further provided with an elongated guard which lies adjacent to the valve-operating member to protect it against angular deflection, the arrangement being such that in use the animal grips both the valve-operating member and the guard in its mouth and presses these two together to tilt the valve-operating member and thus open the valve. According to another aspect of the invention there is provided a device for supplying livestock with water or other liquid comprising a housing, a pivotable valve-operating member extending from the housing and a further fixed extension extending from the housing adjacent the valve-operating member whereby when an animal takes the valve-operating member and the extension in its mouth and presses these two parts together the valve opens and water or other liquid is supplied into the mouth of the animal.

Embodiments of the invention will now be described by way of example only with reference to the accompanying diagrammatic drawings in which.

Figure 1:
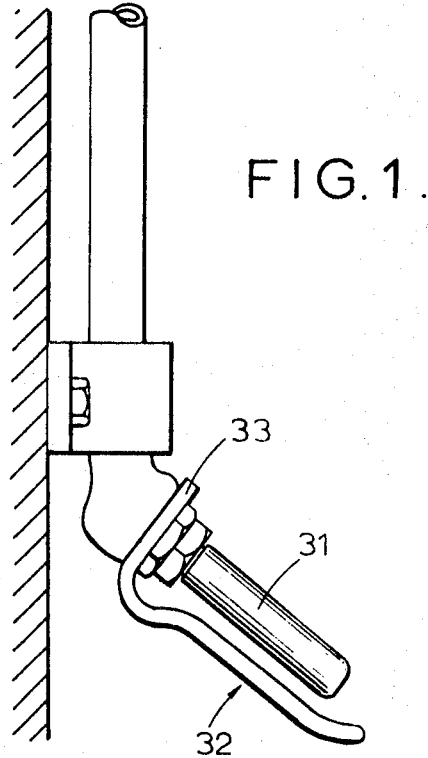
FIG. 1 is a side elevation of a device according to a further aspect of the invention.

A first embodiment of the present invention is shown in FIG. 1. This arrangement includes a steel guard 32. The guard 32 has an apertured bent-over portion 33 by means of which the guard is mounted to the nozzle 31. The guard 32 is arranged below the nozzle 31 and is substantially wider than the nozzle 31 so that it protects the nozzle against operation by a lateral movement or upward movement by an animal pressing against the nozzle. In use, an animal places its mouth over the nozzle 31 and guard 32 and closes its mouth on these two parts. The nozzle 31B in a downward direction and thus opens the valve to cause flow of liquid into the mouth of of the animal.

Figure 2:
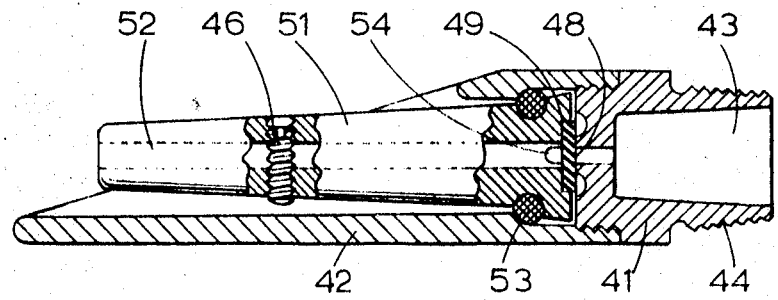
FIG. 2 is a sectional side elevation of a further device in accordance with the invention.

FIG. 2 is a cross-sectional view of a further embodiment of the invention which corresponds in many respects to the device shown in FIG. 1. A valve housing is formed in part by a block 41 and in part by the inner end of a sleeve 42. The outer end of the sleeve 42 extends to form a guard which corresponds to the guard 32 of FIG. 1. The block 41 has a central water supply passage 43 through which in use water or other liquid is supplied from a pipe secured to the threaded portion 44.

The passage 43 terminates at a valve orifice 48 which in the situation shown is closed by a movable valve member 49 of elastomeric material. The valve member 49 is supported on a movable valve-supporting member 51 which forms a drinking nozzle. An axial passage 52 extends through the nozzle 51 and there are communicating passages 54 between the interior of the housing and the passage 52.

The nozzle 51 is pivotally mounted and sealed in the opening of the sleeve 42 by means of an elastomeric O-ring seal 53 which also tends to hold the nozzle 51 in such a position that the valve member 49 closes the valve orifice 48. The outer end of the sleeve 42 is chamfered in such a way that it guards the valve-operating member 51 against operation from below or from the side but enables the nozzle or valve operating member 51 to be tilted downwardly when an animal takes both the sleeve 42 and nozzle 51 in its mouth and squeezes these two components together.

Movement of valve-supporting means 52 toward the sleeve 42 may be restricted by a grub screw 46 thereby controlling the flow of liquid through the valve orifice 43.

In some circumstances it is possible that material such as feed for the animal concerned may build up between the nozzle 51 and the sleeve 42 and thus prevent operation of the device. In order to overcome this possible drawback the underside of the sleeve 42 may be slotted in order to provide an escape for any such material.

Figure 3:
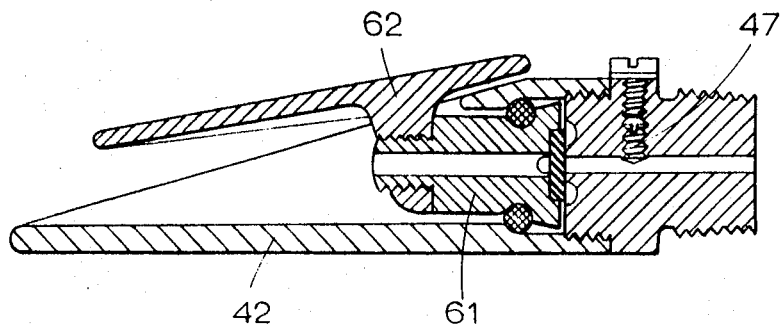
FIGS. 3 and 4 show modifications of the device of FIG. 2.

FIG. 3 shows a further modification of the device of FIG. 2 which is intended to overcome the problem of feed buildup under the nozzle 51. The nozzle 51 is replaced by a short valve-operating member 61 to the outer end of which is secured a valve-operating plate 62. Also the flow control grub screw 46 is replaced by a flow control screw 47 in the inlet to the device. Operation of the device corresponds to operation of the FIG. 2 device with the exception that the animal grips together the plate 62 and the sleeve 42 rather than the nozzle 51 and the sleeve. The sleeve 42 forms a channel or chute down which the water flows into the mouth of the animal. It should be observed that there is a large clearance between the plate 62 and the sleeve 42 so that this space is unlikely to become blocked.

Figure 4:
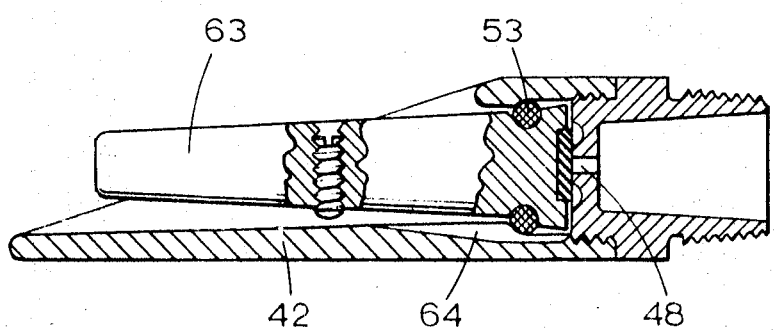

FIG. 4 shows a further modification of the device of FIG. 2 in which the nozzle or hollow valve-operating member 51 of FIG. 2 is replaced by a corresponding solid valve-operating member 63. In this modification water flows from the valve orifice 48 through a longitudinal outlet groove 64 in the lower part of the interior surface of the sleeve 42 when the valve-operating member is moved towards the sleeve. The O-ring seal 53 still seals the major part of the circumference of the opening between the valve-operating member and the housing so that all the water runs out through the groove 64 and down the channel formed by the sleeve 42 to the mouth of the animal.

The devices of FIGS. 2, 3 and 4 may conveniently be mounted for use as indicated in FIG. 1.

Thus the invention provides a variety of ways in which a device for supplying an animal with water or other liquid may be constructed to prevent or restrict operation of the device except when water or other liquid is being consumed by an animal.

We claim:

1. A device for supplying animals with water or other liquid comprising a housing, said housing having an inlet orifice through which, in use, liquid is supplied to the interior of the housing, a movable valve member at the outlet of the valve orifice and within the housing movable to control the flow of liquid through the inlet orifice of the valve into the housing, a movable valve supporting and operating member operatively connected to the housing for relative movement therewith and extending out through an opening in the housing, said movable valve member secured to said valve supporting and operating member at the outlet of the valve orifice and within the housing and adapted to control the flow of liquid through the valve orifice into the housing, means defining a liquid outlet passage from the housing, resilient means operatively connected between the valve supporting and operating member and the housing adapted to urge the valve member into a position where it closes the orifice, a fixed guard member extending from the housing below the valve supporting and operating member, the arrangement being such that tilting movement of the valve supporting and operating member by urging it towards the guard member moves the valve member to open the orifice and thereby provide a flow of liquid through the outlet passage, and adjustable stop means operatively interposed between the valve-operating member and the guard member to control the extent to which the valve-operating member can be moved towards the guard member and thereby control the extent of opening of the valve.

2. A device according to claim 1 including a pivotal connection for said tilting movement to open the orifice provided by interengagement of a rigid portion of said valve operating and supporting member with a rigid portion of said housing.

3. A device according to claim 1 in which the liquid outlet passage extends through the length of the valve supporting member.

4. A device according to claim 1, wherein said fixed guard member is formed to serve as a chute for water or other liquid.

5. A device for supplying animals with water or other liquid comprising a housing, said housing having an inlet orifice through which, in use, liquid is supplied to the interior of the housing, a movable valve member at the outlet of the valve orifice and within the housing movable to control the flow of liquid through the inlet orifice of the valve into the housing, a movable valve supporting and operating member operatively connected to the housing for relative movement therewith and extending out through an opening in the housing, said movable valve member secured to said valve supporting and operating member at the outlet of the valve orifice and within the housing and adapted to control the flow of liquid through the valve orifice into the housing, means defining a liquid outlet passage from the housing, resilient means operatively connected between the valve supporting and operating member and the housing adapted to urge the valve member into a position where it closes the orifice, a fixed guard member comprising a chute for water or other liquid extending from the housing below the valve supporting and operating member, the arrangement being such that tilting movement of the valve supporting and operating member by urging it towards the guard member moves the valve member to open the orifice and thereby establish a flow of liquid through the outlet passage, a pivotal connection for said tilting valve member permitting it to open the orifice and being provided by interengagement of a rigid portion of said valve operating and supporting member with a rigid portion of said housing.

UNITED STATES PATENT OFFICE
CERTIFICATE OF CORRECTION

Patent No. 3,613,642          Dated  October 19, 1971

Inventor(s) George Restall et al.

It is certified that error appears in the above-identified patent and that said Letters Patent are hereby corrected as shown below:

Column 1, line 67, should read -- parts. The nozzle 31 is mounted for pivotal movement in a downward direction and thus opens --.

Signed and sealed this 4th day of April 1972.

(SEAL)
Attest:

EDWARD M. FLETCHER, JR.                ROBERT GOTTSCHALK
Attesting Officer                      Commissioner of Patents